(12) United States Patent
Zhevelev et al.

(10) Patent No.: US 10,565,842 B2
(45) Date of Patent: Feb. 18, 2020

(54) METHOD AND DEVICE FOR OMNIDIRECTIONAL AND ANTI-SABOTAGE ANTI-TAMPERING DETECTION

(71) Applicant: Tyco Fire & Security GmbH, Neuhausen am Rheinfall (CH)

(72) Inventors: Boris Zhevelev, Rishon Le Zion (IL); Yehuda Shviki, Rishon Le Zion (IL)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 15/953,624

(22) Filed: Apr. 16, 2018

(65) Prior Publication Data

US 2019/0318595 A1 Oct. 17, 2019

(51) Int. Cl.
| | | |
|---|---|---|
| G08B 13/24 | (2006.01) | |
| H04N 5/33 | (2006.01) | |
| H04N 7/18 | (2006.01) | |
| G08B 13/196 | (2006.01) | |

(52) U.S. Cl.
CPC ....... *G08B 13/24* (2013.01); *G08B 13/19632* (2013.01); *H04N 5/33* (2013.01); *H04N 7/18* (2013.01)

(58) Field of Classification Search
CPC .................................................... G08B 13/24
USPC ........................................................ 340/541
See application file for complete search history.

(56) References Cited

U.S. PATENT DOCUMENTS

| | | | | |
|---|---|---|---|---|
| 7,388,484 | B2* | 6/2008 | Hsu | G06F 21/83 |
| | | | | 340/506 |
| 9,153,118 | B2* | 10/2015 | Frederick | G08B 21/0213 |
| 9,569,942 | B2* | 2/2017 | Richter | G08B 13/149 |
| 9,739,637 | B2* | 8/2017 | Feucht | G01D 5/145 |
| 2005/0003845 | A1* | 1/2005 | Pollard | G08B 13/2462 |
| | | | | 455/521 |
| 2007/0290845 | A1* | 12/2007 | Benjelloun | G08B 29/046 |
| | | | | 340/568.1 |
| 2008/0143525 | A1 | 6/2008 | Woodbury et al. | |

(Continued)

FOREIGN PATENT DOCUMENTS

| | | |
|---|---|---|
| EP | 1227452 A1 | 7/2002 |
| GB | 2487560 A | 8/2012 |

OTHER PUBLICATIONS

European Search Report issued for corresponding European Application No. 19168760.7, dated Sep. 19, 2019. (3 pages).

*Primary Examiner* — Qutbuddin Ghulamali
(74) *Attorney, Agent, or Firm* — Arent Fox LLP (57) ABSTRACT

A method and device for omnidirectional and anti-sabotage anti-tampering detection are disclosed. For this purpose, a proposed security device assembly includes a mounting bracket, a security device such as a motion detector or surveillance camera, and an anti-tampering system. The security device is mounted via the mounting bracket. The anti-tampering system includes a permanent magnet and a magnetometer for detecting a magnetic field of the permanent magnet, and includes a controller. The controller detects changes in the magnetic field that are indicative of movement between the mounting bracket and the security device. In general, the anti-tampering system spans across the mounting bracket and the security device. Preferably, the permanent magnet is attached to the mounting bracket and the magnetometer is included within the security device.

20 Claims, 7 Drawing Sheets

(56) References Cited

U.S. PATENT DOCUMENTS

2010/0106428 A1* 4/2010 Anderson .............. G01B 7/14
　　　　　　　　　　　　　　　　　702/33
2016/0165323 A1* 6/2016 Hollis .................... H04Q 9/00
　　　　　　　　　　　　　　　　　340/870.16
2017/0228603 A1* 8/2017 Johnson ............ G06K 9/00771

* cited by examiner

METHOD AND DEVICE FOR OMNIDIRECTIONAL AND ANTI-SABOTAGE ANTI-TAMPERING DETECTION

BACKGROUND OF THE INVENTION

Security devices are often installed in buildings to monitor the buildings, and to detect and identify emergency situations within the buildings. The security devices typically communicate with a control system such as a panel over a wired or wireless security network. Upon detecting the activity and/or individuals and/or potentially dangerous situations, the security devices send signals or messages indicative of the activity or situations to the control panel. Security personnel can then analyze the messages received at the control panel, and dispatch first responders such as police or fire personnel in response the given situation. Examples of security devices include surveillance cameras, motion detectors, and fire detection devices, to list a few examples.

These security devices include fixed security devices and adjustable security devices. Fixed security devices mount directly to a fixed surface such as a wall and cannot be adjusted once installed. Adjustable security devices, on the other hand, typically have a mounting base or mount that fastens to the fixed surface or wall, and the security devices are held by and can be adjusted within the mount, often by the installer. These adjustable security devices each have an axis of orientation, about which each security device can be oriented/adjusted within its mount.

Security devices with anti-tampering systems have been proposed. The anti-tampering systems might limit physical access to the security devices, and/or can detect some instances of tampering of the security devices. For example, it has been proposed to use switches to detect removal of the devices from the wall. In other cases, it has been proposed to use plungers between sensors and their bases that detect when the sensors are removed from the bases.

SUMMARY OF THE INVENTION

These anti-tampering systems have limitations. One limitation is that the anti-tampering systems typically do not detect movement of the security devices about their axis of orientation. Instead, movement of the security devices in this fashion is typically associated with adjusting of the devices rather than as tampering events. As a result, a thief or interloper might simply rotate a motion detector security device in its mount to point away from the area the device was installed to monitor.

A proposed security device assembly can detect when the device has been moved in its mount and/or when it is removed from the mount and/or when the device and mount are removed from the wall, for example.

In general, according to one aspect, the invention features a security device assembly. The security device assembly comprises a mounting bracket, a security device that is mounted via the mounting bracket, and an anti-tampering system. The anti-tampering system includes a permanent magnet and a magnetometer for detecting a magnetic field of the permanent magnet, and includes a controller that determines changes in the magnetic field indicative of movement between the mounting bracket and/or mounting surface and the security device.

Preferably, the permanent magnet is attached to the mounting bracket. The security device includes a housing, and the magnetometer is contained within the housing. The housing might be generally cylindrical.

The mounting bracket includes a body that mounts to a surface and a knockout included within the body. The knockout is removably attached to the body and mounts to the same surface as the body. Preferably, the permanent magnet is attached to the knockout.

In examples, the security device is a motion detector or a surveillance camera. The security device is able to rotate within the mounting bracket.

In one implementation, the magnetometer is a Hall effect sensor including a ferromagnetic core and a magnetic field sensor positioned within a gap of the ferromagnetic core. Typically, the magnetometer produces voltages over time that represent the detected magnetic field of the permanent magnet. The controller obtains the voltages from the magnetometer, and determines the changes in the magnetic field indicative of movement between the mounting bracket and the security device based upon the voltages obtained from the magnetometer.

The controller also stores a minimum and a maximum voltage that represent an allowed range of the detected magnetic field. The controller can then conclude that the changes in the magnetic field indicative of movement between the mounting bracket and the security device are associated with tampering of the security device when the voltages obtained from the magnetometer are less than the minimum voltage or greater than the maximum voltage.

In general, according to another aspect, the invention features a method for detecting tampering of a security device. The method includes generating a magnetic field from a mounting bracket of the security device, detecting the magnetic field at the security device, and determining changes in the magnetic field that are indicative of movement between the mounting bracket and the security device.

Typically, detecting the magnetic field at the security device comprises a magnetometer contained within the security device detecting the magnetic field generated from the mounting bracket.

In one example, determining changes in the magnetic field that are indicative of movement between the mounting bracket and the security device comprises a magnetometer contained within the security device producing voltages over time that represent the detected magnetic field, obtaining the voltages from the magnetometer, and determining the changes in the magnetic field based upon the voltages obtained from the magnetometer.

Typically, determining the changes in the magnetic field based upon the voltages obtained from the magnetometer comprises storing a reference voltage that represents the magnetic field at the security device for an initial position of the security device within the mounting bracket, and comparing the voltages obtained from the magnetometer to the reference voltage to determine whether the obtained voltages have changed as compared to the reference voltage.

Additionally, the method can conclude that the changed obtained voltages indicate tampering of the security device in response to: determining that the changed obtained voltages are greater than a maximum voltage that represents a maximum value of the magnetic field; or that the changed obtained voltages are less than a minimum voltage that represents a minimum value of the magnetic field.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
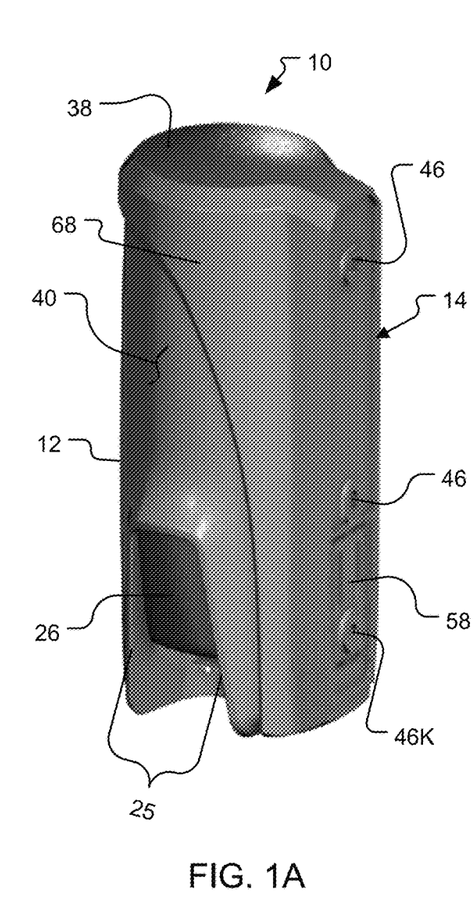
FIG. 1A is a perspective scale view of a security device assembly constructed according to an embodiment of the present invention, showing a mounting bracket and a motion detector security device of the assembly.

FIG. 1A is a perspective scale view of a security device assembly 10.

The security device assembly 10 includes a motion detector as the security device 12 and a mounting bracket 14. The motion detector 12 is mounted via the mounting bracket 14 to a mounting surface, such as wall, for example. The security device assembly 10 also includes an anti-tampering system, which is hidden from view in FIG. 1A. In general, the anti-tampering system spans across portions of the assembly 10 including the mounting bracket 14 and the motion detector 12.

The mounting bracket 14 is generally L-shaped and has multiple portions. The mounting bracket 14 has a body 68, a top 38, a base 27, and a knockout 58 within the body 38. The top 38 extends outward from the body 68, thus forming the general L-shape of the bracket 14. The knockout 58 is located within the body 68 near the base 27. The knockout 58 is removably attached to the body 68. The base 27 attaches to a bottom of the body 68.

The view of this figure shows a rear side of the body 38 of the mounting bracket 14. This view shows how the mounting bracket 14 attaches to a fixed surface, such as a wall 45. The body 58 mounts to the wall 45 typically using screws. The screws secure the body 58 to the wall 45 via mounting holes 46 of the bracket 14. The knockout 58 is also mounted to the wall 45, using a screw between mounting hole 46K of the knockout 68 and the wall 45.

The motion detector 12 has a housing 40, a port 25, and a transparent window 26 in the housing 40. The port 25 of the housing 40 allows light such as infrared light to enter the transparent window 26. The housing 40 is generally cylindrical in shape. The motion detector 12 is shown seated/mounted within the mounting bracket 14. The housing 40 is typically made of a lightweight material such as plastic.

In the illustrated example, the security device 12 is a motion detector. However, security device can also be a surveillance cameras or a fire detection device, in examples.

Figure 1B:
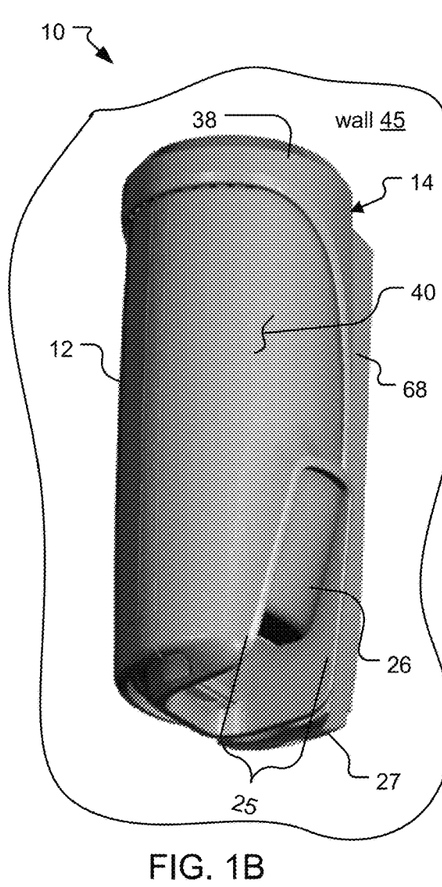
FIG. 1B is another perspective scale view of the security device assembly, where the assembly is shown mounted to a wall, and also shows how the motion detector can rotate within the mounting bracket.

FIG. 1B is another perspective scale view of the security device assembly 10.

Here, the assembly 10 is shown mounted to the wall 45, and also shows the motion detector 12 rotated within the mounting bracket 14 at an extreme end of its adjustability.

Figure 1C:
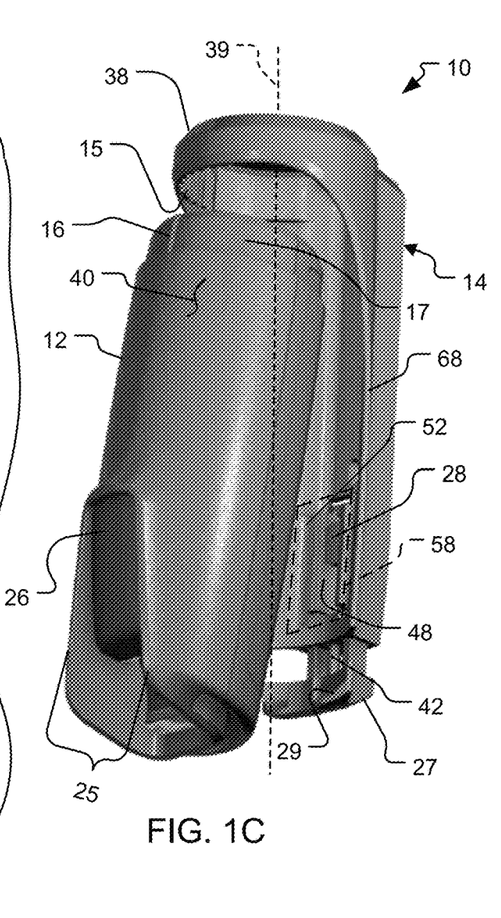
FIG. 1C is another perspective scale view of the security device assembly, where the motion detector is shown exploded out of the mounting bracket.

FIG. 1C is another perspective scale view of a security device assembly 10. The motion detector 12 is shown exploded out of the mounting bracket 14.

This view provides more detail for the motion detector 12 and the mounting bracket 14. This view also shows that motion detector 12, via its housing 40, is detachably coupled to the mounting bracket 14.

More detail for the mounting bracket 12 is shown. The top 38 of the mounting bracket 14 is generally circular in shape and includes detents 15. The detents 15 are included within an inside surface of the top 38. The knockout 58 includes a channel 48 formed by ridges 52 of the knockout 58. A permanent magnet 28 is attached to the channel 48 of the knockout 58. The base 27 of the mounting bracket 14 has a curved lip 29 that extends outward from the base towards the motion detector 12. The base 27 also attaches to the bracket 14 via a fastener 42 (e.g. captive screw).

More detail for the motion detector 12 is also shown. The housing 40 additionally includes a recessed portion 17 and a notch 16 upon the recessed portion 17.

The housing 40 of the motion detector 12 is seated/mounted within the bracket 14 as follows. The top 38 of the bracket 14 receives the recess 17 of the housing 40. Specifically, the notch 16 of the housing 40 engages within one of the detents 15 to provide an interference fit between the housing 40 of the motion detector 12 and the mounting bracket 14 to prevent rotation. Then, an installer secures the base 27 to the bracket 14 via fastener 42 to securely hold the motion detector 12 within the bracket 14. When the base 27 is secured, its curved lip 29 is underneath and comes in contact with the bottom of motion detector 12 near the port 25 of its housing 40. As a result, the motion detector 12 is held by/mounted within the mounting bracket 14 and restricted from rotation.

The motion detector 12 can be adjusted (i.e. rotated) along an axis of orientation 39 with respect to the mounting bracket 14. The axis of orientation 39 runs through a center of the top 38 of the mounting bracket 14, in a north-south direction along its body 38. When the motion detector 12 is fully seated within the bracket, the axis of orientation 39 also passes through the center of the housing 40 in a north-south direction.

To adjust the orientation of the motion detector 12, an installer first unscrews fastener 42 that holds the motion detector 12 in place within the base 27 of the bracket 14. Then, the installer removes the motion detector 12 from the top 38 of the bracket 14 until the notch 16 of the housing 40 no longer engages with the detents 15. The installer then rotates the motion detector 12 around the axis of orientation 39 to the desired location, and inserts the housing 40 back into the top 38 of the bracket 12 such that the notch 16 of the recess 17 of the housing 40 engages with the detent 15 at that location Finally, the installer tightens fastener 42 of the base 27 to again secure the motion detector 12 within the mounting bracket 14 and restrict its rotation.

Figure 2:
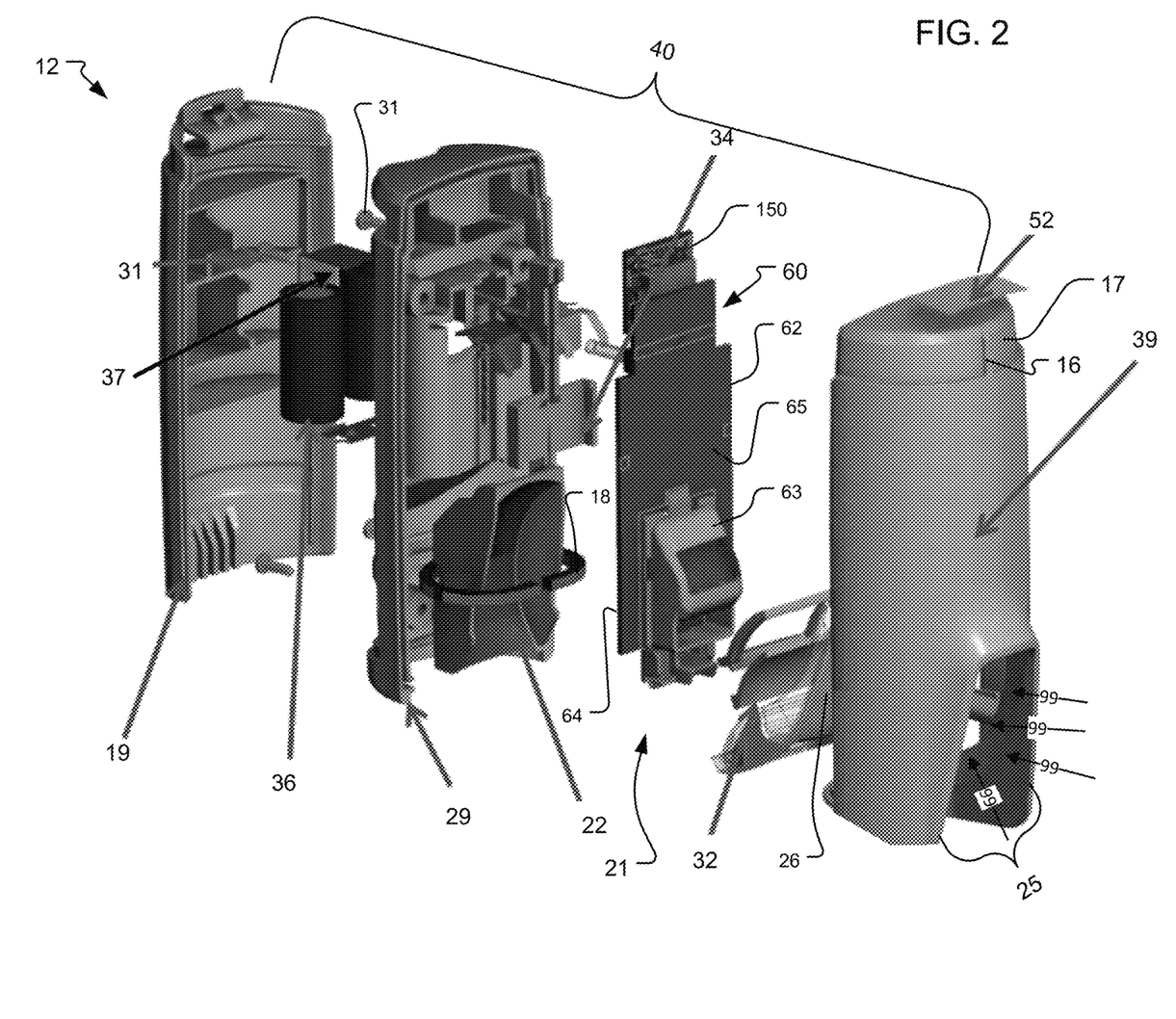
FIG. 2 is an exploded view of the motion detector in FIG. 1A-1C.

FIG. 2 is an exploded view of the motion detector 12 in FIG. 1A-1C.

The exploded view shows portions of the housing 40 of the motion detector 12. The view also shows components included within the motion detector 12 that were hidden from view in FIG. 1A-1C.

The housing 40 includes a front portion 39, a middle portion 29, and a back portion 19. The middle portion 29 fastens to the front portion 39 via screws 31. The back portion 19 attaches to the middle portion 29 via a snap fit, in one example. These portions are typically made from plastic or other lightweight material that can be formed/molded to meet design and assembly considerations.

The front portion 39 and back portion 19 have rounded exterior surfaces. These rounded exterior surfaces form the generally cylindrical shape of the housing 40 when the when all portions 39, 29, and 19 are attached.

The middle portion 29 and the front portion 39 of the housing 40 define a cavity within the housing 40. The cavity houses various components including a sensor module 60, a motion sensor system 21, and some components of the anti-tampering system. Generally, the motion sensor system 21 spans across the middle portion 29 and the front portion 39 of the housing. The components of the anti-tampering system that are within the cavity defined by the housing 40 also generally span across the middle portion 29 and the front portion 39 of the housing 40.

The sensor module 60 includes a printed circuit board (PCB) 62 and a daughter board 150. The PCB 62 has a front side 65 and a back side 64.

Some components of the motion sensor system 21 are shown. These components include the transparent window 26, a mirror 22, a mask 34, a PE window 32, and a motion sensor cover 63. The mirror 22 and mask 34 are attached to an inside surface of the middle portion 29 of the housing 40. The motion sensor cover 63 is mounted to the front side 65 of the PCB 62.

The motion sensor system 21 also includes a motion sensor, which is mounted to the back side 64 of the PCB 62. In one example, the motion sensor is a passive infrared (PIR) sensor.

The motion detector 12 is typically installed within a room or hallway of a building and detects motion of objects such as individuals. The motion sensor system 21 of the motion detector 12 detects motion of individuals based on infrared (IR) energy emitted by objects such as the individuals.

The motion sensor system 21 generally operates as follows. Photons of infrared (IR) energy 99 emitted from objects in a room enter the port 25 of housing 40. The IR photons 99 then pass through transparent window 26. The transparent window 26 is transmissive to IR photons 99, especially those of long IR wavelengths. The IR photons 99 are then transmitted through PE window 32, are reflected off mirror 22 and then possibly blocked by mask 34. The reflected IR photons 99 that are not blocked by the mask 34 are then detected by the PIR sensor (mounted to the back side 64 of the PCB 62). The motion sensor then produces an output voltage that is proportional to the energy of the IR photons 99 detected. The output voltage is then analyzed by a controller. Sudden increases in infrared energy detected by the motion sensor cause increased voltages to be produced by the motion sensor, and the controller can infer movement by comparing the voltage increases to a baseline voltage.

A ferromagnetic core 18 of the anti-tampering system is shown. The ferromagnetic core 18 is attached to an inside surface of the middle portion 29 of the housing 40. The ferromagnetic core 18 is also arranged/assembled within the housing 40 such that the ferromagnetic core 18 wraps around the mirror 22 of the motion sensor system 21.

Batteries 36 are located within the back portion 19 and the middle portion 29 of the housing 40. The batteries 36 provide a source of input power to the sensor module 60, the anti-tampering system, and the motion sensor system 21. The batteries 36 are attached to a rear side of the middle portion 29 of the housing 40, via a pull tab 37. In the illustrated example, the back portion 19 is a removable cover for the batteries 36.

A label 52 can also be affixed to the recess 17 of the housing 40. The label 52 might include serial number information of the motion detector 12, and instructions for calibrating the anti-tampering system.

Figure 3:
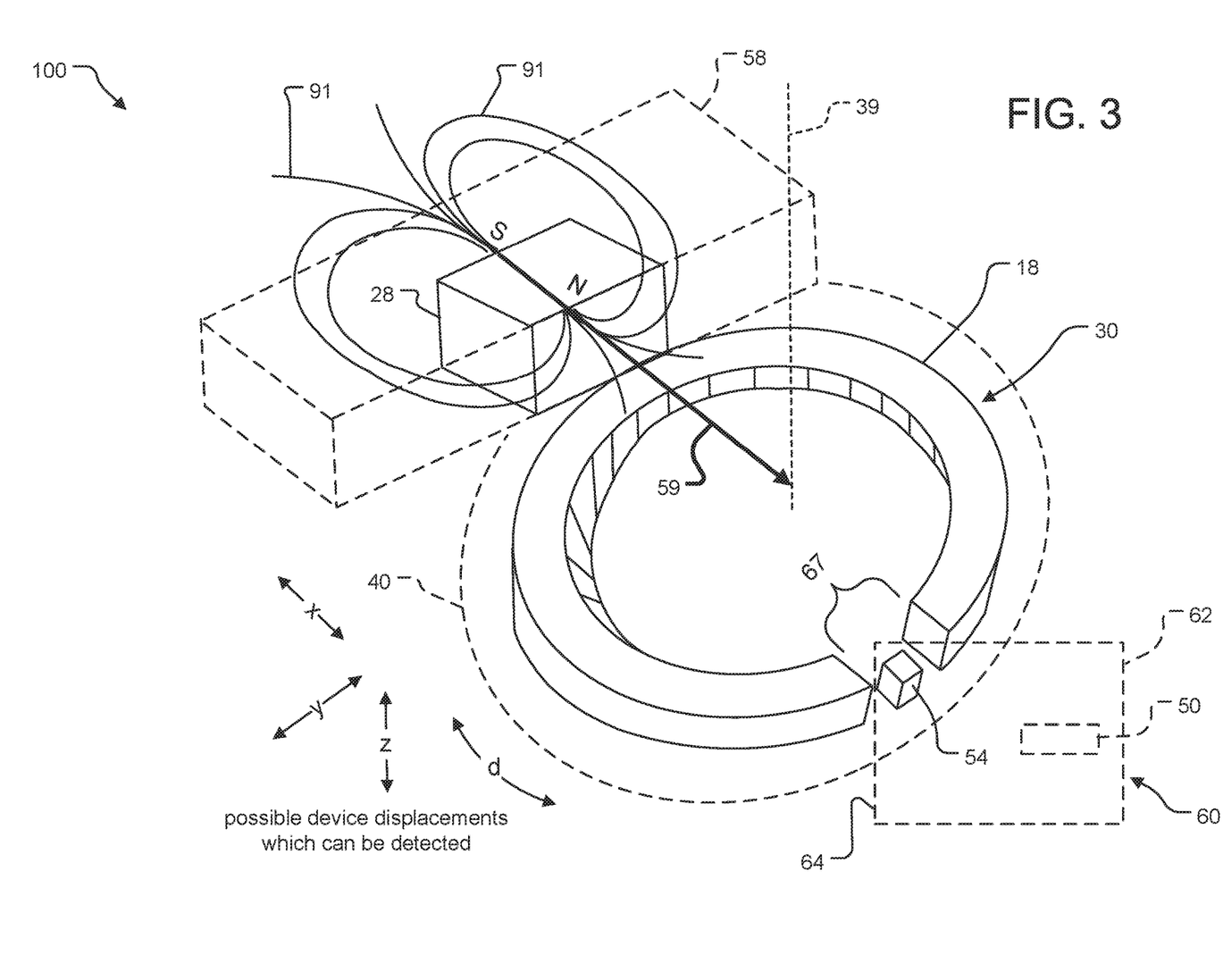
FIG. 3 is schematic view of the security device assembly that shows detail for an anti-tampering system of the security device assembly.

FIG. 3 is a schematic view of the security device assembly 10. This view enables detail for the anti-tampering system 100 of the assembly 10 to be shown and described.

The anti-tampering system 100 spans across the motion detector 12 and the bracket 14 of the security device assembly 10, and includes various components of the assembly 10. The anti-tampering system 100 includes the permanent magnet 28, a magnetometer 30, and a controller 50. The permanent magnet 28 is attached to the knockout 58 as previously shown in FIG. 1C, where only a portion of the knockout 58 is shown. The magnetic field sensor 54 and the controller 50 are mounted to the PCB 62 of the sensor module 60.

The magnetometer 30 is contained within the housing 40 and includes the ferromagnetic core 18 and a magnetic field sensor 54. Specifically, the magnetometer 30 is included within the cavity defined by the middle portion 29 and the front portion 39 of the housing 40.

The magnetic field sensor 54 also extends outward from the back side 65 of the PCB 62 towards the ferromagnetic core 18. Specifically, the magnetic field sensor 54 extends outward from the PCB 62 such that it resides within a gap 67 of the ferromagnetic core 18.

The permanent magnet 28 is oriented with respect to the ferromagnetic core 18 as follows. The permanent magnet 28 is adjacent to a side of the ferromagnetic core 18 that is opposite the gap 67. The ferromagnetic core 18/magnetometer 30 is centered around the axis of orientation 39, and an imaginary line 59 that extends through both North and South poles of the magnet 28 intersects the axis of orientation 39. Preferably, the imaginary line 59 intersects the axis of orientation 39 at a right angle. Here, the North (N) pole of the permanent magnet 28 along the imaginary line 59 is toward the ferromagnetic core 18. Magnetic flux lines 91 of the magnetic field produced by the permanent magnet 28 are also shown.

The permanent magnet 28 induces a magnetic field within the ferromagnetic core 18 of the magnetometer 30. This is because of the proximity of the permanent magnet 28 to the ferromagnetic core 18 and the material composition of the core 18. As a result, the magnetic field of the permanent magnet 28 is effectively transferred to the ferromagnetic core 18.

In one example, the magnetic field sensor is a Hall effect sensor. This transducer produces an output voltage in response to a magnetic field. The output voltage varies in proportion to the strength of the magnetic field within the core 18, detected by the magnetic field sensor 54 within the gap 67 of the ferromagnetic core 18.

Preferably, the ferromagnetic core 18 is made from a "magnetic soft material" such as ferronickel (FeNi) or ferrosilicon (FeSi), in examples. These materials exhibit very low residual magnetism once a magnetic field source (such as the permanent magnet 28) is removed from the vicinity of the ferromagnetic core 18. In another example, the ferromagnetic core 18 is made from transformer steel, such as a "1010" carbon steel alloy having 0.10% carbon content. In each of these materials, the relatively soft iron core and its high permeability with respect to air surrounding the core 18 increases the strength of the magnetic field within the core 18.

The ferromagnetic core 18 has a preferred shape. In the illustrated example, the ferromagnetic core 18 is C-shaped and has a gap 67. The magnetic field sensor 54 is placed to be within the gap 67. The shape and material of the core 18 maximize its ability to concentrate or focus magnetic flux lines of the magnetic field within the core 18 and towards the gap 67 for detection by the magnetic field sensor 54.

The ferromagnetic core 18 also has a variable profile. This variable profile permits correlation of an angular position of the magnetometer 30 with respect to the magnetic field within the gap 67.

The magnetometer 30 of the anti-tampering system 100 generally operates as follows. When the housing 40 of the motion detector 12 is fully seated within the mounting bracket 14, the permanent magnet 28 attached to the knockout 58 induces a magnetic field within the ferromagnetic core 18 of the magnetometer 30. The ferromagnetic core 18 concentrates the magnetic field, and directs flux lines of the magnetic field towards the gap 67. The magnetic field sensor 54 then senses the magnetic field within the gap 67, and produces a voltage corresponding to the magnetic field for consumption and analysis by the controller 50.

The anti-tampering system 100 detects displacement (i.e. movement) of the motion detector 12 with reference to an initial position of the motion detector 12 within the bracket 14. An installer defines the initial position of the motion detector during a calibration procedure. After the calibration, many different displacements of the motion detector 12 can be detected by the anti-tampering system 100. Exemplary displacements x, y, z, and d are shown.

The calibration procedure to define an initial position of the motion detector 12 is as follows. First, an installer rotates the housing 40 within the bracket 14 to have the desired horizontal orientation (i.e. in the 'd' direction around axis 39) and then secures the housing 40 within the bracket 14 via the fastener 42 of the base 27. The installer then presses a calibration button on the housing 40, or alternatively sends a wireless calibration message via a user device such as a mobile phone or tablet to the controller 50. In response, the magnetic field sensor 54 produces an output voltage that represents the magnetic field of the magnetometer 30 for the initial position of the motion detector 12, and stores the voltage as a reference voltage.

The anti-tampering system 100 then detects displacement/movement of the motion detector 12 relative to the initial position of the motion detector 12 by obtaining voltages produced by the magnetometer 30 over time, and comparing the voltages to the reference voltage. The controller 50 of the anti-tampering system 100 monitors the voltages produced by the magnetic field sensor 54 of the magnetometer 30. When the controller 50 determines that the voltage from the magnetometer 30 has changed with respect to the reference voltage, the controller 50 interprets this change as movement between the mounting bracket 14 and the security device 12.

The controller 50 then compares the changed voltage against an allowed range of voltages to conclude that the movement between the mounting bracket 14 and the security device 12 is associated with a tampering event. For this purpose, the controller 50 maintains a maximum allowed voltage and a minimum allowed voltage. The maximum and minimum voltages represent an allowed range of the magnetic field within the ferromagnetic core 18. If the changed voltage is beyond the range of voltages defined by the minimum and maximum voltages, the controller 50 concludes that the movement between the mounting bracket 14 and the security device 12 is associated with a tampering event.

Experimentation has shown that the anti-tampering system 100 can detect even slight displacements of the motion detector 12 in any of the x, y, z, or d directions as compared to the initial position of the motion detector 12. Even slight displacements produce significant changes to the magnetic field sensed by the magnetometer 30. This situation can be easily detected by the magnetic field sensor 54.

The "x" displacement can be detected when the motion detector 12 is removed from the wall mounted bracket 14 and the motion detector 12 is moved increasingly away from the bracket 14 in the x direction. When the motion detector 12 is increasingly removed from the bracket 14 in the x direction, the ferromagnetic core 18 of the magnetometer 30 contained within the housing 40 increasingly moves away from the magnetic field of the permanent magnet 28. As a result, the magnetic flux induced within the ferromagnetic core 18 decreases, and the magnetic field sensor 54 produces a correspondingly lower voltage.

The "d" displacement can be detected when the motion detector 12 is rotated within the bracket 14 around the axis of orientation 39. The "y" displacement can be detected when the motion detector 12 is removed from the bracket 14 and moved left or right relative to the axis of orientation 39. The "z" displacement can be detected when the motion detector 12 is removed from the bracket 14 and then moved in a north-south plane formed by the axis of orientation 39. Finally, various combinations of these displacements might also trigger a tampering event.

Tampering actions that the anti-tampering system 100 can detect include removal of the motion detector 12 from its mounting bracket 14, rotation of the motion detector 12 along the axis of orientation 39 within the bracket 14, and "masking sabotage" actions. A masking sabotage action might occur when a thief or interloper places a magnet or other device that generates a magnetic field in close proximity to the motion detector 12. This masking sabotage tampering action can cause changes in the magnetic field of the magnetometer 30, which the anti-tampering system 100 can detect.

The anti-tampering system 100 might also detect when the security device assembly 10 is forcibly removed from a wall 45, in some circumstances. This could occur when the body 68 of the mounting bracket 14 and the knockout 58 of the body 68 are both secured to a framing member of a wall, and a thief places a pry bar between the wall 45 and the top 38 of the bracket 14 to forcibly remove the bracket 14 from the wall 45. Though the body 68 of the bracket 14 (and motion detector 12 held within the bracket) are removed from the wall 45, the knockout 58 is designed to break away from the body 68 and yet remain fastened to the wall 45. The knockout 58 might remain attached to the wall because of the screw that fastens the knockout 58, via its mounting hole 46K, to the wall 45 and channel in the bracket that forms the knockout. Because the permanent magnet 28 is attached to the knockout 58 and the magnetometer 30 is no longer near the permanent magnet 28, the anti-tampering system 100 would detect this as a tampering event.

Figure 4:
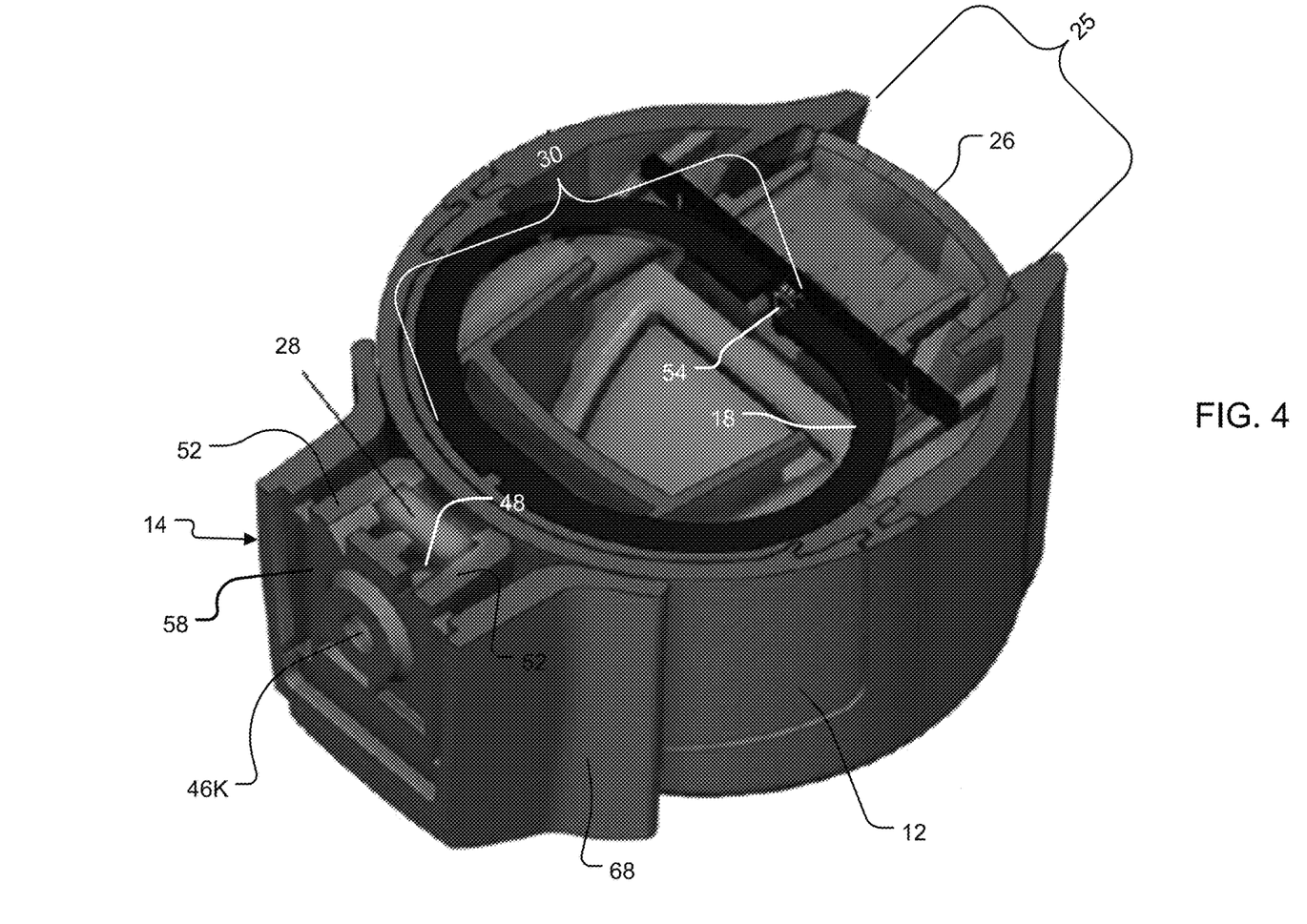
FIG. 4 is a cross sectional view of the security device assembly, shown in perspective, that also shows components of the anti-tampering system.

FIG. 4 is a cross sectional view of the security device assembly 10, shown in perspective, that also shows components of the anti-tampering system 100.

The view of this figure shows a rear side of the body 38 of the mounting bracket 14.

This view provides more detail for how the permanent magnet 28 attaches to the knockout 58. Here, the permanent magnet 28 is seated within the channel 48 of the knockout 58, between the ridges 52 that form the channel 48.

Figure 5A:
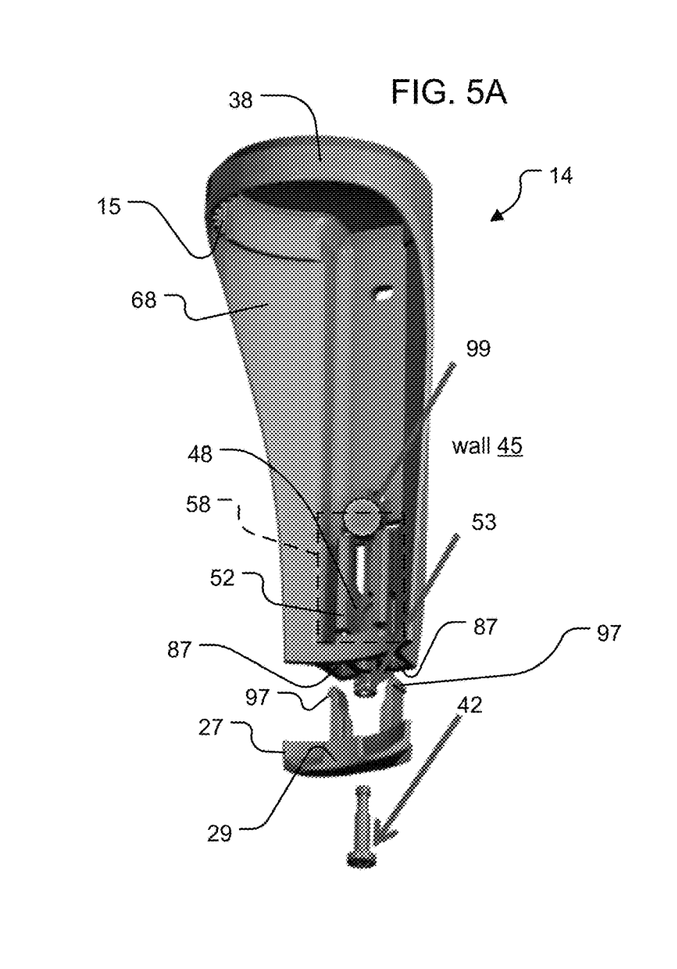
FIG. 5A is an exploded perspective view of the mounting bracket.

FIG. 5A is an exploded perspective view of the mounting bracket 14. This view provides more detail for how the base 27 attaches to the body 68 of the bracket 14.

In more detail, the base 27 has tabs 97 that extend upwards from the base 27. The body 68 has slots 87 that accept the tabs 97. The body 68 also has a threaded insert 53 that seats within the body 68 and accepts the fastener 42.

When the tabs 97 are placed within the slots 87 and the base 27 is pushed upwards towards the top 38 of the bracket 14, the tabs 97 engage with the body 68. This provides a "snap fit" of the base 27 to the body 68. An installer then tightens the fastener 42 within the threaded insert 53 of the body 68 to secure the base 27 to the body 68.

Reference 199 also illustrates how the knockout 58 of the mounting bracket 14 can break away from the body portion 68 of the bracket 14, but the knockout 58 can still be attached to the wall 45, in some scenarios.

Figure 5B:
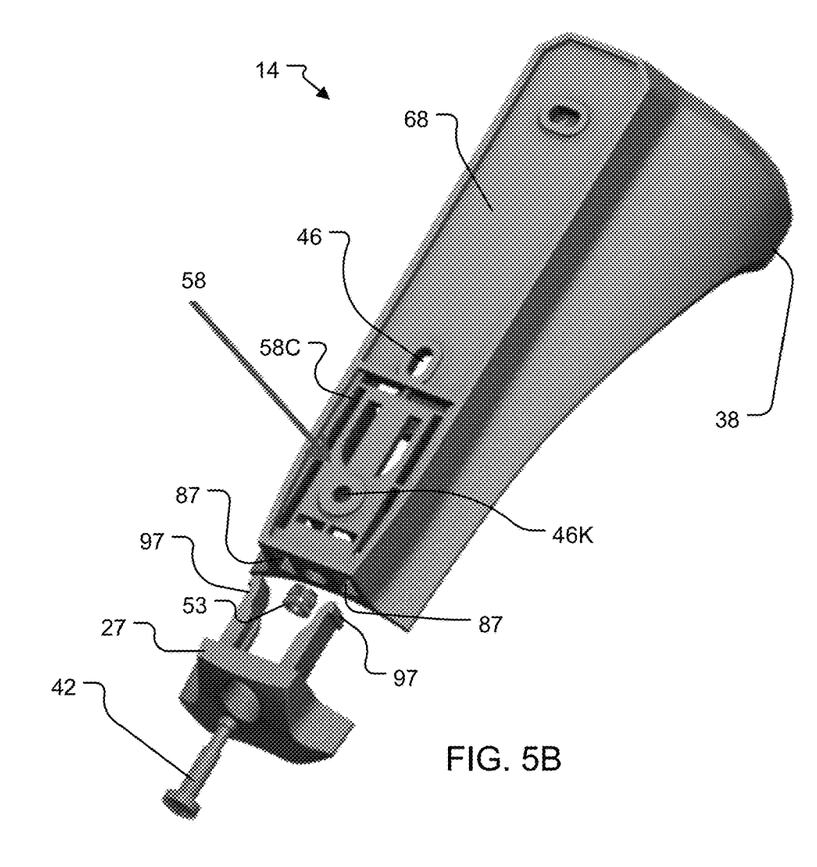
FIG. 5B is an exploded rear view of the mounting bracket in FIG. 5A.

FIG. 5B is an exploded rear view of the mounting bracket 14 in FIG. 5A.

This view provides more detail for the knockout 58 and the way the base 27 attaches to the body 68 of the mounting bracket 14. The knockout 58 and permanent magnet 28 can remain attached to the wall 45 due to a screw placed in hole 46K due to the channel 58C of reduced material between the knockout 58 and the rest of the mounting bracket 14 allowing the knockout 58 to break away from the rest of the bracket.

Figure 6:
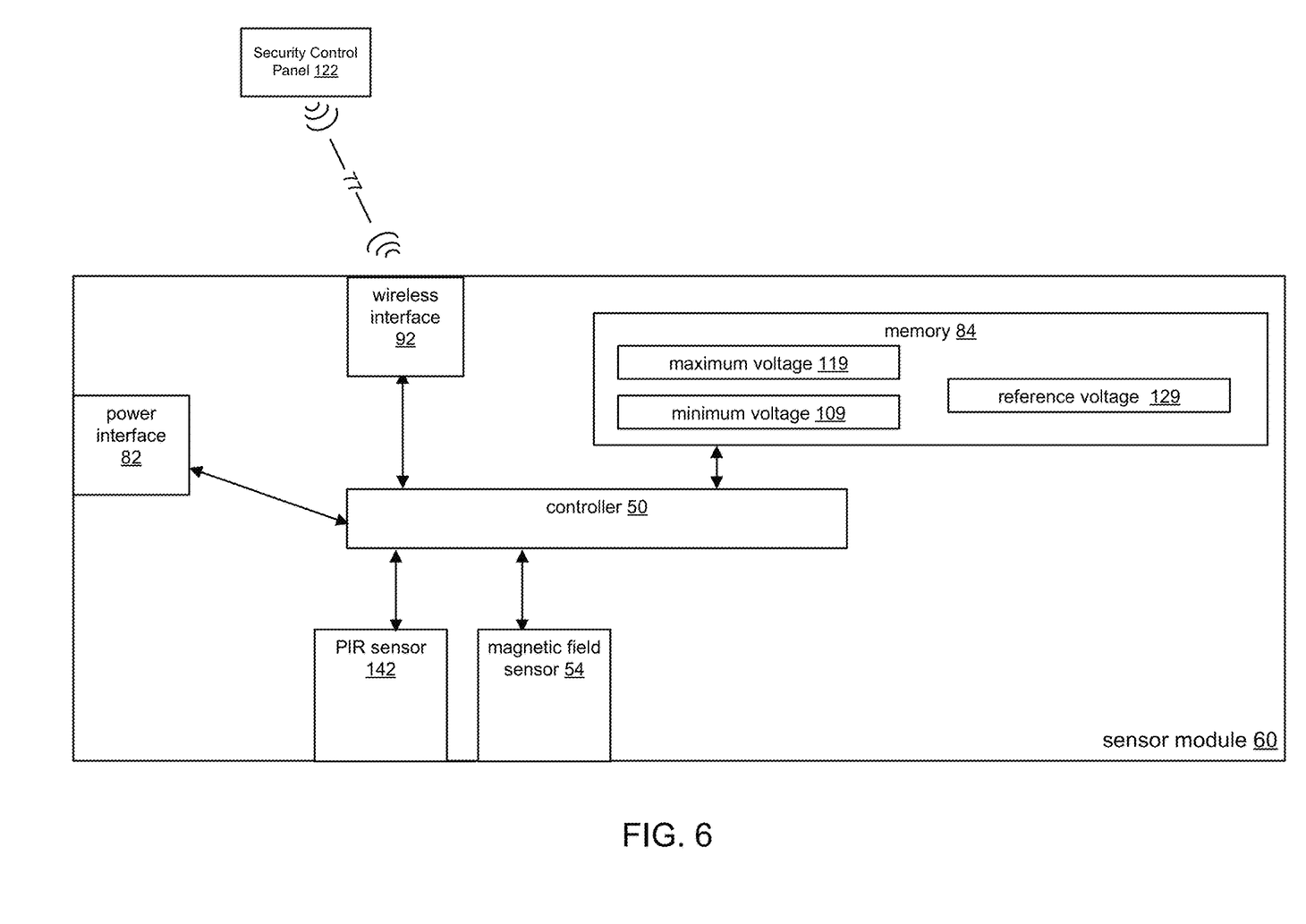
FIG. 6 is a block diagram that illustrates various components of a sensor module within the motion detector.

FIG. 6 is a block diagram that illustrates various components of the sensor module 60.

The sensor module 60 includes the controller 50 and other components that communicate with and are controlled by the controller 50. These components include a power interface 82, a wireless interface 92, a memory 84, the PIR sensor 142, and the magnetic field sensor 54.

The power interface 82 connects to batteries 36 or a wired source of power. The PIR sensor 142 is part of the motion sensor system 21. The magnetic field sensor 54 and controller 50 are part of the anti-tampering system 100. The wireless interface 92 enables external wireless communications between the sensor module 60 and a security control panel 122.

The memory 84 includes a reference voltage 129, a minimum voltage 109 and a maximum voltage 119 for the anti-tampering system 100. The minimum and maximum voltages 109/119 represent a minimum and maximum allowed value for the magnetic field of the magnetometer 30, respectively. The minimum and maximum voltages 109/119 also define a range of allowed voltages for the voltages obtained by the controller 50 from the magnetometer 30. The controller 50 stores the reference voltage 129 obtained during calibration of the anti-tampering system 100 by an installer.

The controller 50 also communicates with the security control panel 122. In one implementation, the controller 50 prepares messages and instructs the wireless interface 92 to transmit the messages over a wireless channel 77 to the security control panel 122. In examples, the wireless channel 77 uses Bluetooth signals such as Bluetooth Low Energy (BLE) signals or WiFi signals. Typically, the controller 50 prepares and sends messages upon concluding that tampering of the assembly 10 has occurred. In another example, the controller 50 might send messages concerning operational state/status of the motion detector 12 on an infrequent basis.

Figure 7:
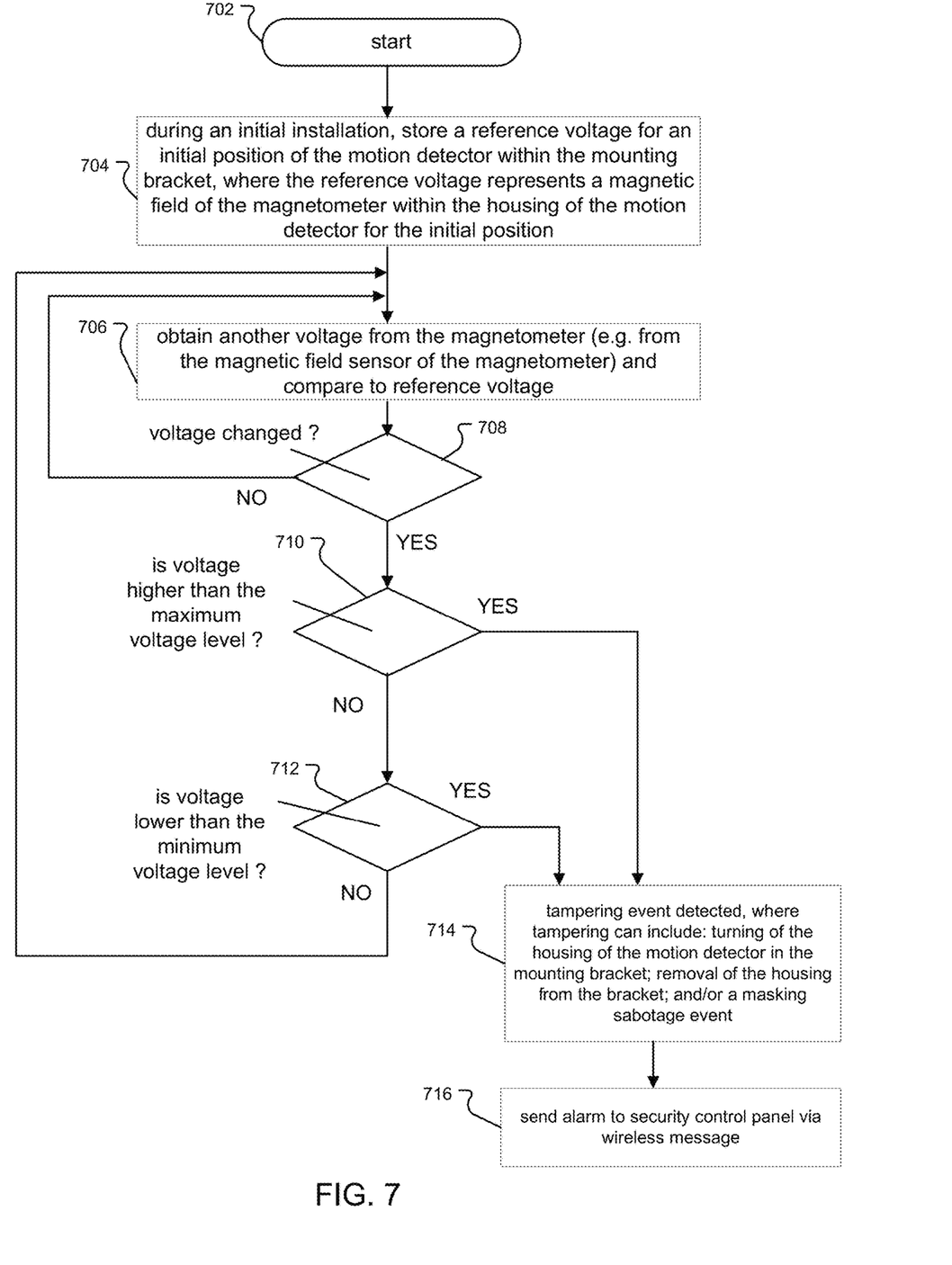
FIG. 7 is a flow diagram that shows a method of operation for a controller of the anti-tampering system.

FIG. 7 is a flow chart that describes a method of operation for the controller 50. The method begins in step 702.

In step 704, during an initial installation, the controller 50 stores a reference voltage 129 for an initial position of the motion detector 12 within the mounting bracket 14. The reference voltage 129 represents a magnetic field of the magnetometer 30 within the housing 40 of the motion detector 12 for the initial position of the motion detector 12. The controller stores the reference voltage 129 within memory 84. Typically, this step is performed as part of a calibration of the anti-tampering system 100.

In step 706, the controller 50 obtains another voltage from the magnetic field sensor 54 of the magnetometer 30. The controller 50 then compares the obtained voltage to the reference voltage 129. In one implementation, the controller 50 polls the magnetic field sensor 54 on the order of 100 milliseconds to obtain its voltage. In another example, the polling interval is as large as 1 to 5 seconds to conserve the batteries 36.

In another implementation, the controller 50 does not begin polling for the voltage until triggered by the motion sensor system 21. In this way, the controller 50 does not access the voltage produced by the magnetic field sensor 54 until the PIR sensor 142 of the motion sensor system 21 has both detected motion and determined that the motion is of a type that the motion sensor system 21 should report (e.g. motion of an individual rather than a pet).

According to step 708, the controller 50 determines whether the (obtained) voltage is different from the reference voltage 129. A change in the voltage represents a change in the magnetic field of the magnetometer 30, as compared to the magnetic field of the magnetometer 30 for the initial position of the motion detector 12.

If the voltage is different/has changed, the method transitions to step 710. Otherwise, the method transitions back to the beginning of step 706 to obtain another voltage from the magnetic field sensor 54.

In step 710, the controller 50 determines if the obtained voltage is greater than the maximum voltage 119. If the voltage is greater than the maximum voltage 119, the method transitions to step 714. Otherwise, the method transitions to step 712.

In step 712, the controller 50 determines if the obtained voltage is less than the minimum voltage 109. If the voltage is less than the minimum voltage 109, the method transitions to step 714. Otherwise, the method transitions to the beginning of step 706 to obtain a new voltage from the magnetic field sensor 54.

In one implementation, the controller 50 calculates the minimum voltage 109 and maximum voltage 119 based upon the reference voltage 129. For example, after obtaining the reference voltage 129 for the initial position of the motion detector 12 within the bracket 14, the controller 50 can define the maximum voltage 119 to be 10% greater than the reference voltage 129 and the minimum voltage 109 to be 10% less than the reference voltage 129. In another example, the controller 50 can define the maximum voltage 119 to be 5% greater than the reference voltage 129 and the minimum voltage 109 to be 5% less than the reference voltage 129. The controller 50 stores the minimum and maximum voltages 109/119 along with the reference voltage 129 to the memory 84 of the sensor module 60.

In another implementation, the minimum voltage 109 and maximum voltage 119 are stored within memory 84 as factory settings.

According to step 714, the controller 50 concludes that the detected motion of the motion detector 12 is associated with a tampering event. A tampering event can include turning of the housing 40 of the motion detector 12 in the mounting bracket 14, removal of the housing 40 from the bracket 14, and/or a masking sabotage event, in examples.

In step 716, the controller 50 prepares a message for transmission over wireless network 77 to a security control panel 122. The message indicates that a tampering event upon the motion detector 12 has occurred. The controller 50 sends the message via its wireless interface 92 to the security control panel 122.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security device assembly, comprising:
   a mounting bracket;
   a security device that is seated and rotatable within the mounting bracket about an axis of orientation;
   a permanent magnet attached to the mounting bracket;
   a magnetometer contained within the security device for detecting a magnetic field generated by the permanent magnet; and
   a controller that determines changes in the magnetic field detected by the magnetometer are indicative of a rotation of the security device within the mounting bracket, wherein, in response to the determined changes in the magnetic field being beyond an allowed range, the controller determines that the rotation of the security device within the mounting bracket is associated with a tampering with the security device.

2. The security device assembly of claim 1, wherein the security device includes a housing removably connectable to the mounting bracket, and wherein, when the security device is fully seated within the mounting bracket, the axis of orientation runs through the housing of the security device.

3. The security device assembly of claim 1, wherein the mounting bracket includes a body and a top portion extending from the body, and wherein the axis of orientation runs through the top portion of the mounting bracket and along the body of the mounting bracket.

4. The security device assembly of claim 1, wherein the mounting bracket includes:
   a body that mounts to a surface and a knockout included within the body, wherein the knockout is removably attached to the body and mounts to a same surface as the body, and wherein the permanent magnet is attached to the knockout.

5. The security device assembly of claim 1, wherein the security device is a motion detector.

6. The security device assembly of claim 1, wherein the security device is a surveillance camera.

7. The security device assembly of claim 1, wherein the security device comprises a fire detection device.

8. The security device assembly of claim 1, wherein the magnetometer includes a Hall effect sensor and a ferromagnetic core.

9. The security device assembly of claim 1, wherein the magnetometer produces voltages over time that represent the magnetic field of the permanent magnet, and wherein the controller obtains the voltages from the magnetometer, and determines the changes in the magnetic field indicative of the rotation of the security device based upon the voltages obtained from the magnetometer.

10. The security device assembly of claim 9, wherein the controller stores the voltages that represent the magnetic field, and wherein the controller determines that the changes in the magnetic field indicative of the rotation of the security device are associated with the tampering with the security device when current voltages obtained by the magnetometer indicate the changes.

11. The security device assembly of claim 1, wherein the security device includes a housing that is generally cylindrical.

12. A method for detecting a tampering with a security device, comprising:
   detecting, by a magnetometer contained within the security device that is seated and rotatable within a mounting bracket about an axis of orientation, a magnetic field generated by a permanent magnet attached to the mounting bracket;
   determining changes in the magnetic field detected by the magnetometer are indicative of a rotation of the security device within the mounting bracket; and determining, in response to the determined changes in the magnetic field being beyond an allowed range, that the rotation of the security device within the mounting bracket is associated with the tampering with the security device.

13. The method of claim 12, wherein the security device includes a housing removably connectable to the mounting bracket, and wherein, when the security device is fully seated within the mounting bracket, the axis of orientation runs through the housing of the security device.

14. The method of claim 12, wherein determining the changes in the magnetic field that are indicative of the rotation of the security device within the mounting bracket comprises:
   the magnetometer contained within the security device producing voltages over time that represent the magnetic field;
   obtaining current voltages from the magnetometer; and
   determining the changes in the magnetic field based upon the current voltages obtained from the magnetometer.

15. The method of claim 14, wherein determining the changes in the magnetic field based upon the current voltages obtained from the magnetometer comprises:
   storing reference voltages that represent the magnetic field at the security device for an initial position of the security device; and
   comparing the current voltages obtained from the magnetometer to the reference voltages to determine whether the current voltages have changed as compared to the reference voltages.

16. The method of claim 15, wherein determining that the current voltages indicate the tampering with the security device is further in response to:
   determining that the current voltages are greater than a maximum voltage that represents a maximum value of the magnetic field, or that the current voltages are less than a minimum voltage that represents a minimum value of the magnetic field.

17. The method of claim 12, wherein the security device comprises a motion detector.

18. The method of claim 12, wherein the security device comprises a surveillance camera.

19. A security device assembly, comprising:
   a mounting bracket including a knock-out holding a permanent magnet and being attached to a mounting surface;
   a security device that is seated and rotatable within the mounting bracket about an axis of orientation; and
   a magnetic field sensor that detects a magnetic field generated by the permanent magnet and includes a controller that determines changes in the detected magnetic field are indicative of a rotation of the security device within the mounting bracket, the controller further determining that the security device has been rotated within the mounting bracket in response to the determined changes in the magnetic field being beyond an allowed range.

20. The security device assembly of claim 19, wherein the magnetic field sensor produces voltages over time that represent the magnetic field of the permanent magnet, wherein the magnetic field sensor determines that the security device has rotated within the mounting bracket based on changes in the voltages.

\* \* \* \* \*